(12) United States Patent
Sato et al.

(10) Patent No.: US 8,991,590 B2
(45) Date of Patent: Mar. 31, 2015

(54) PRODUCT COLLECTION APPARATUS

(71) Applicants: Takayuki Sato, Kitasaku-gun (JP); Kiyoto Shinohara, Kitasaku-gun (JP)

(72) Inventors: Takayuki Sato, Kitasaku-gun (JP); Kiyoto Shinohara, Kitasaku-gun (JP)

(73) Assignees: Citizen Holdings Co., Ltd., Tokyo (JP); Citizen Machinery Miyano Co., Ltd., Nagano (JP)

( * ) Notice: Subject to any disclaimer, the term of this patent is extended or adjusted under 35 U.S.C. 154(b) by 98 days.

(21) Appl. No.: 13/628,879

(22) Filed: Sep. 27, 2012

(65) Prior Publication Data

US 2013/0098738 A1    Apr. 25, 2013

(30) Foreign Application Priority Data

Oct. 21, 2011   (JP) ................. 2011-231562

(51) Int. Cl.
| | |
|---|---|
| *B65G 29/00* | (2006.01) |
| *B65G 17/00* | (2006.01) |
| *B65G 21/00* | (2006.01) |
| *B65G 25/00* | (2006.01) |
| *B65G 23/22* | (2006.01) |
| *B65G 23/32* | (2006.01) |
| *B65G 23/38* | (2006.01) |
| *B65G 47/52* | (2006.01) |

(52) U.S. Cl.
CPC ............. *B65G 23/22* (2013.01); *B65G 23/32* (2013.01); *B65G 23/38* (2013.01); *B65G 47/52* (2013.01)
USPC ........................................ 198/611

(58) Field of Classification Search
None
See application file for complete search history.

(56) References Cited

U.S. PATENT DOCUMENTS

| | | | | |
|---|---|---|---|---|
| 4,697,688 A | * | 10/1987 | Kimbell et al. | ............ 198/346.2 |
| 5,740,899 A | * | 4/1998 | Pugh et al. | .................... 198/392 |
| 6,346,982 B1 | | 2/2002 | Yasuda et al. | |
| 6,782,991 B2 | * | 8/2004 | Johansson | ..................... 198/401 |

FOREIGN PATENT DOCUMENTS

JP          3184183         4/2001

* cited by examiner

*Primary Examiner* — Kavel Singh
(74) *Attorney, Agent, or Firm* — Finnegan, Henderson, Farabow, Garrett & Dunner, L.L.P.

(57) ABSTRACT

A product collection apparatus which provides a product conveyed by a conveyance belt to a rotary table to collect the product includes a conveyance belt to be rotated; a rotary table supported rotatably, linkage unit which links a driving force input unit for conveyance belt which receives driving force to rotate the conveyance belt and a driving force input unit for rotary table which receives driving force to rotate the rotary table, and an actuator which transfers the driving force to the conveyance belt and the rotary table through the linkage unit.

3 Claims, 9 Drawing Sheets

PRODUCT COLLECTION APPARATUS

This application is a new U.S. patent application that claims benefit of JP 2011-231562, filed on Oct. 21, 2011, the entire content of JP 2011-231562 is hereby incorporated by reference.

BACKGROUND OF THE INVENTION

1. Field of the Invention

The present invention relates to a product collection apparatus.

2. Description of the Related Art

Conventionally, as disclosed in Patent Publication No. 3184183, an apparatus is known which includes a belt conveyor being rotated and a turntable supported rotatably, and collects products carried on the belt conveyor by providing products to turntable.

The above-described apparatus drives the belt conveyor and turntable separately, and therefore requires a transition unit in order to provide products to the turntable. Thus, according to the apparatus, it is difficult to provide products to the turntable from belt conveyor.

SUMMARY OF THE INVENTION

To solve the problem, a product collection apparatus includes a conveyance belt to be rotated; a rotary table supported rotatably, linkage unit which links a driving force input unit for conveyance belt which receives driving force to rotate the conveyance belt and a driving force input unit for rotary table which receives driving force to rotate the rotary table, and an actuator which transfers the driving force to the conveyance belt and the rotary table through the linkage unit, wherein a product conveyed by the conveyance belt is provided to the rotary table and is collected.

The conveyance belt and the rotary table are rotated intermittently by intermittently driving the actuator.

The rotary table may be supported at a frame side, the frame supporting the conveyance belt.

Moreover, a support plate may be integrally fixed to the frame, a base plate may be integrally fixed to the support plate, the rotary table may be rotatably supported by the base plate, idler sprockets may be rotatably supported by the support plate, and an endless chain which is the linkage unit may be wound between a drive sprocket mounted on the driving force input unit for conveyance belt and a driven sprocket mounted onto the driving force input unit for rotary table through the idler sprockets.

DESCRIPTION OF THE DRAWINGS

The present invention will be understood more clearly with reference to the following accompanied drawings wherein.

DETAILED DESCRIPTION

Hereinafter, with reference to drawings, a product collection apparatus will be described. It is to be noted that the present invention is not limited to drawings and embodiments described below.

Figure 1:
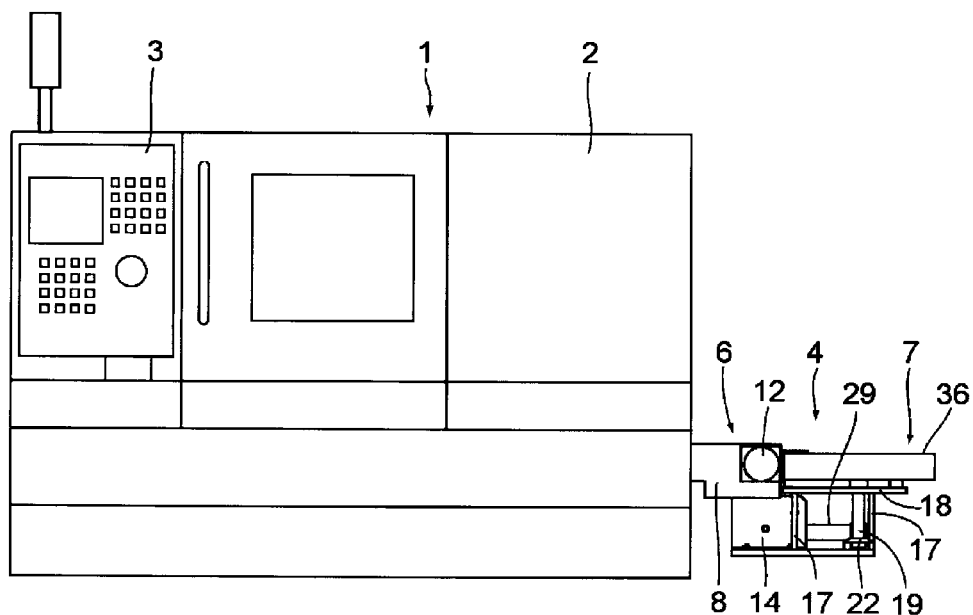
FIG. 1 is a front view illustrating an automatic lathe equipped with a product collection apparatus.

FIG. 1 is a front view illustrating an automatic lathe equipped with the product collection apparatus. The automatic lathe 1 (hereinafter, also referred to as "machine") includes a machine body 2 and a control device 3 provided with a numerical control unit, etc., as conventional lathe. A main shaft which is supported so as to be rotatably driven, a blade stand corresponding to the main shaft (both of which are not illustrated), etc., are provided in the machine body 2, as conventional lathe.

The control device 3 controls operations of the main shaft, the blade stand, etc. As the conventional technique, the automatic lathe 1, in own machine, holds a workpiece with the main shaft under a control by the control device 3, and processes the workpiece by a tool mounted on the blade stand into a predetermined product.

The product collection apparatus 4 includes a conveyor apparatus 6 and an accommodation unit 7. The product processed by the automatic lathe 1 is conveyed from inside of the automatic lathe 1 to outside thereof by the conveyor apparatus 6. The conveyed product is provided to the accommodation unit 7, and is accommodated therein.

Figure 2:
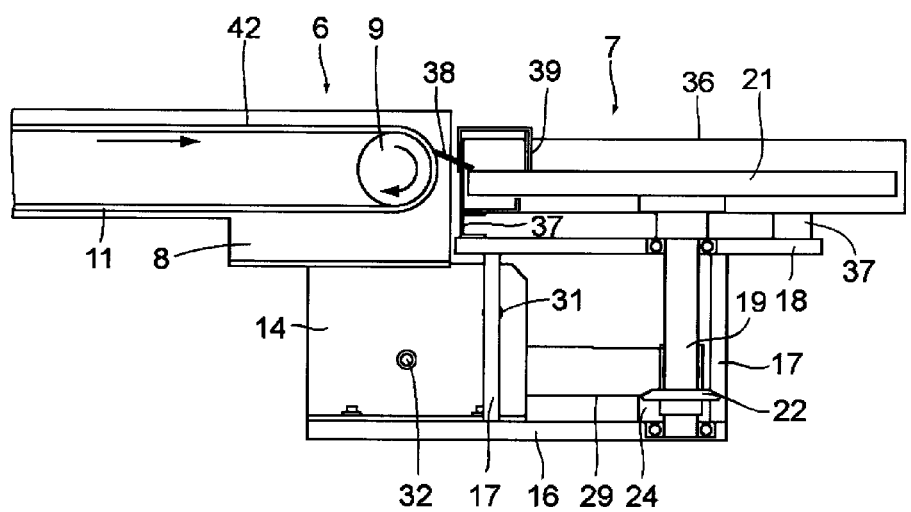
FIG. 2 is a main part sectional front view illustrating the product collection apparatus.
Figure 3:
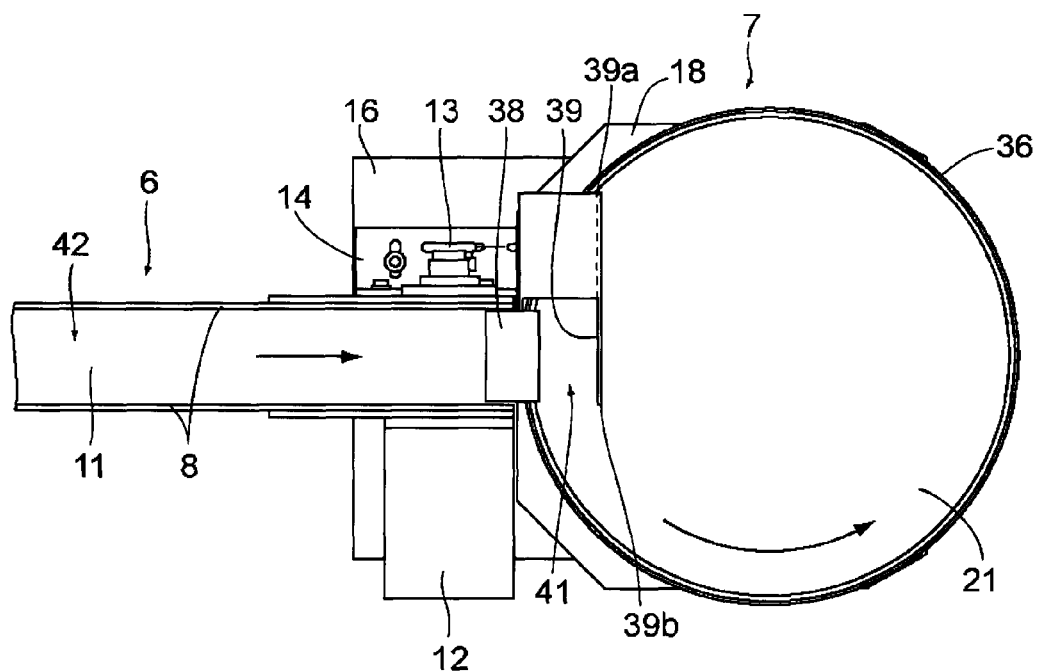
FIG. 3 is a plan view illustrating the product collection apparatus.
Figure 4:
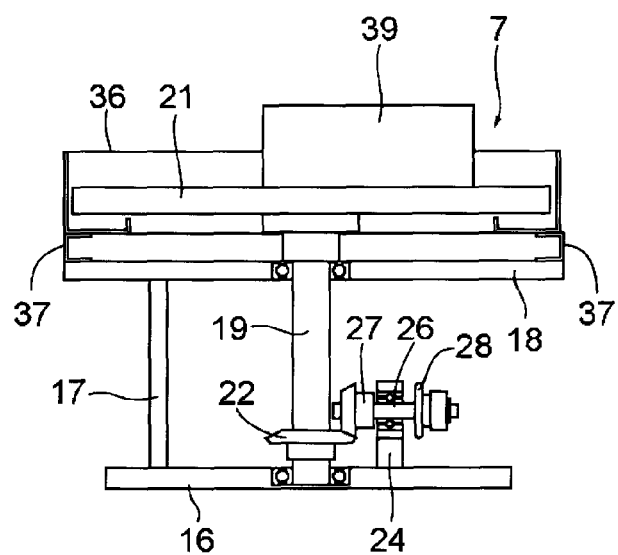
FIG. 4 is a main part sectional side view illustrating the product collection apparatus.
Figure 5:
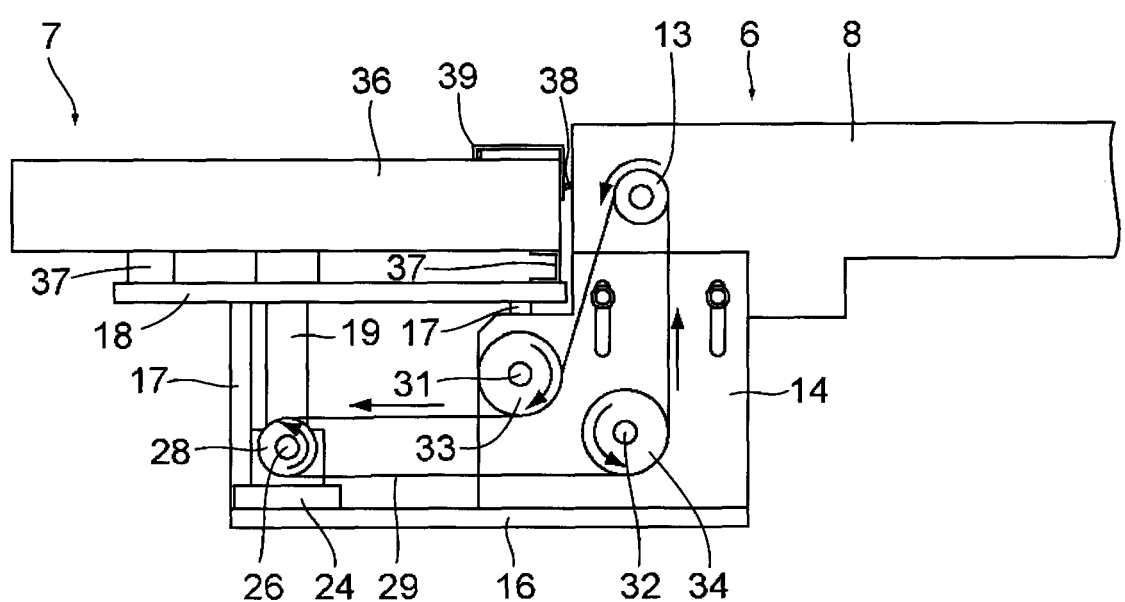
FIG. 5 is a rear view illustrating the product collection apparatus.

FIG. 2 is a main part sectional front view illustrating the product collection apparatus. FIG. 3 is a plan view illustrating the product collection apparatus. FIG. 4 is a main part sectional side view illustrating the product collection apparatus. FIG. 5 is a rear view illustrating the product collection apparatus.

The conveyor apparatus 6 is provided with a frame 8 which extends from inside of the automatic lathe 1 to outside thereof as illustrated in FIG. 2, and an endless belt 11 which is a conveyance belt wound between a fulcrum shaft (not illustrated) inside the machine supported by the frame 8 and a fulcrum shaft 9 outside the machine.

A motor 12 is mounted on the frame 8 as an actuator. The fulcrum shaft 9 receives, at one end side thereof, a driving force from a driving shaft of the motor 12. That is, the fulcrum shaft 9 has a function as a driving force input unit for conveyance belt, which transfers the driving force from the motor 12 to the endless belt 11. Driving the motor 12 rotates the fulcrum shaft 9 and drives the endless belt to rotate. A drive sprocket 13 is mounted on another end side of the fulcrum shaft 9.

As illustrated in FIG. 2 and FIG. 3, a support plate 14 is integrally fixed downward to the frame 8. Under the support plate 14, a base plate 16 is integrally fixed along a horizontal direction. A support rod 17 is provided vertically on the base plate 16. A table support frame 18 which has a plate shape is mounted at the tip of the support rod 17. A rotation shaft 19 is rotatably supported by the table support frame 18 and the base plate 16.

A rotary table 21 is fixedly mounted on the tip of the shaft 19. A bevel gear 22 is integrally mounted at the base end side of the rotation shaft 19. A support block 24 is integrally fixed to the base plate 16. As illustrated in FIG. 4, a support shaft 26 is rotatably supported by the support block 24.

A bevel gear 27 which engages with the bevel gear 22 is integrally mounted at one end side of the support shaft 26. A driven sprocket 28 is mounted at another end of the support shaft 26. As illustrated in FIG. 5, an endless chain 29 is wound between the drive sprocket 13 and the driven sprocket 28. Idler sprockets 33 and 34 are pivotally supported by the support plate 14 through fulcrum shafts 31 and 32.

The endless chain 29 engages with each idler sprocket 33 and 34, and thus a rotation path is determined. When rotating the fulcrum shaft 9 of the conveyor apparatus 6, the driving force is transferred from the drive sprocket 13 to the driven sprocket 28 through the endless chain 29, and the driving force rotates the rotation shaft 19 through both the bevel gears 27 and 22 and rotates the rotary table 21. That is, the support shaft 26 has a function as a driving force input unit for rotary table, which transfers the driving force from the motor 12 to the rotary table 21. The endless chain 29 has a function of linkage unit, which links the fulcrum shaft 9 being the driving force input unit for conveyance belt of the endless belt 11, and the support shaft 26 being a drive force input unit of the rotary table 21.

An accommodation unit 7 is provided with the rotary table 21, a ring cover 36 which covers an outer circumference of the rotary table 21, and a guide plate 39 provided on an upper surface of the rotary table 21. The rotary table 21 is formed with a plate which has a circular shape in a planar view, and is arranged close to a half turn of the endless belt 11 located outside the machine (fulcrum shaft 9 part outside the machine).

The upper surface of the rotary table 21 is located lower than the upper surface of the endless belt 11. The ring cover 36 is fixedly supported by the table support frame 18 through a stay 37, and it forms a peripheral wall along the outer circumference of the rotary table 21. A leading plate 38 is integrally fixed to ring cover 36 in an inclined state. The leading plate extends from the half turn part of the endless belt 11 located outside the machine and reaches the upper surface of the rotary table 21.

The guide plate 39 is formed by bending a plate and is integrally fixed to the stay 37. The guide plate 39 is arranged in a position a predetermined distance away from the leading plate 38. According to the guide plate 39, an installation space 41 surrounded by the guide plate 39 and the ring cover 36 is formed. One end 39a of the guide plate 39 is close to the ring cover 36, and another end 39b thereof is a predetermined distance away from the ring cover 36.

The installation space 41 is closed at one end 39a side of the guide plate 39, and is opened at another end 39b side. The lower edge of the guide plate 39 is slightly spaced apart from the upper surface of the rotary table 21, and it does not prevent a rotation of the rotary table 21.

In the product collection apparatus 4, the endless belt 11 is used as a conveyance belt, and the upper surface of the endless belt 11 is used as the conveyance surface 42. Further, by driving the motor 12, the endless belt 11 is rotated in a direction which cause a movement of the conveyance surface 42 from inside of the machine to outside of the machine, and the rotary table 21 is rotated toward the open end of the installation space 41 from the closed end thereof. Under a control by the control device 3, the motor 12 is rotated each time when processing of a product is finished with the automatic lathe 1.

Since the motor 12 rotates intermittently, the conveyance surface 42 moves each fixed distance (1 pitch) intermittently, and the rotary table 21 interlocks with the movement of the conveyance surface through the endless chain 29 and is rotated each fixed angle (1 pitch) intermittently. The product which has been processed in the automatic lathe 1 is provided to the conveyance surface 42 of the endless belt 11 inside of the automatic lathe 1. The endless belt 11 is controlled to move by 1 pitch, when the product is provided to the conveyance surface 42.

Figure 6A:
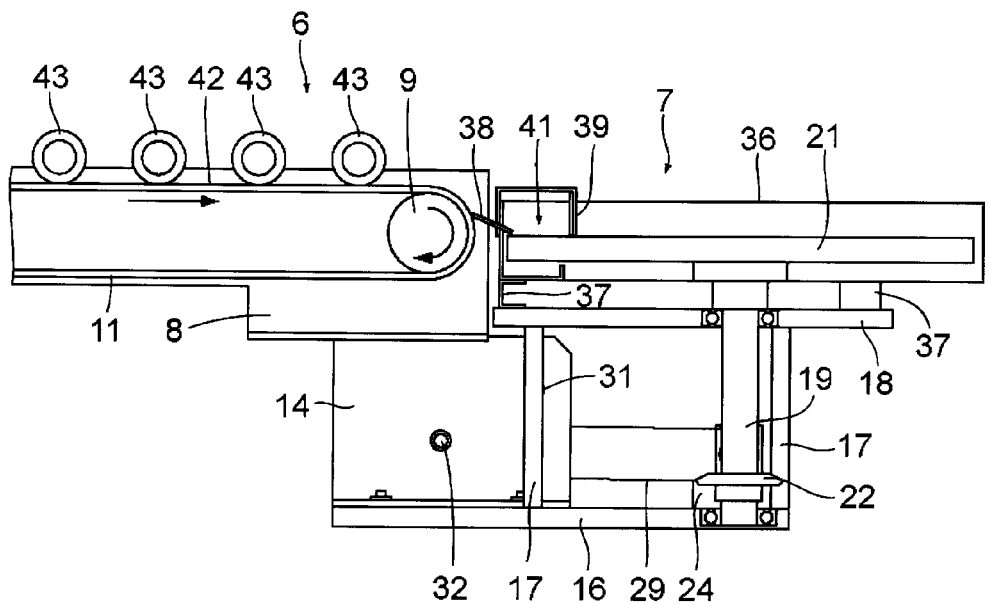
FIG. 6A is a main part sectional front view illustrating the product collection apparatus in a product conveyance state, and illustrating a state before a product is provided to an installation space.
Figure 6B:
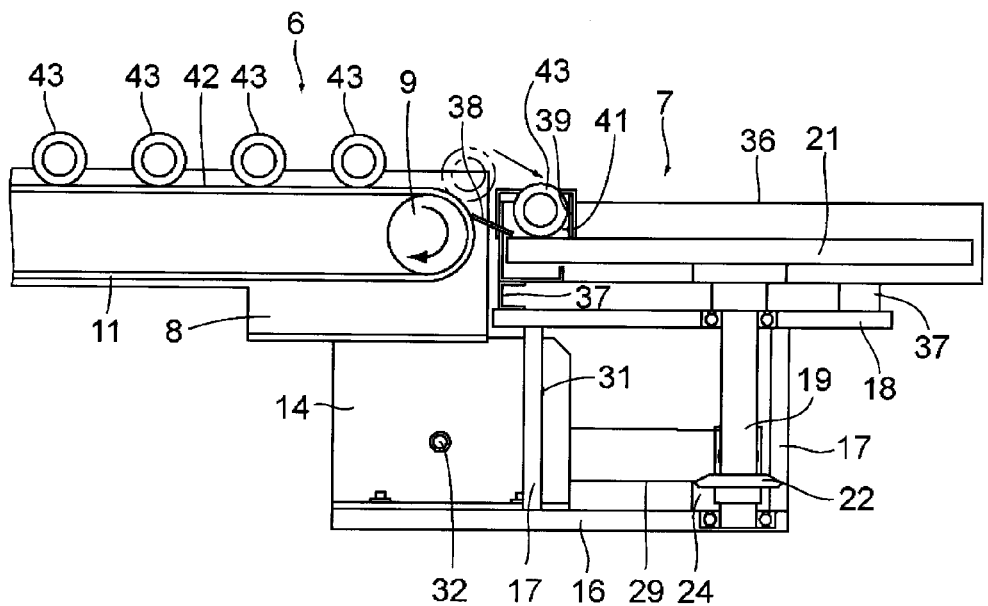
FIG. 6B is a main part sectional front view illustrating the product collection apparatus in the product conveyance state, and illustrating a state where the product has been provided to the installation space.
Figure 7A:
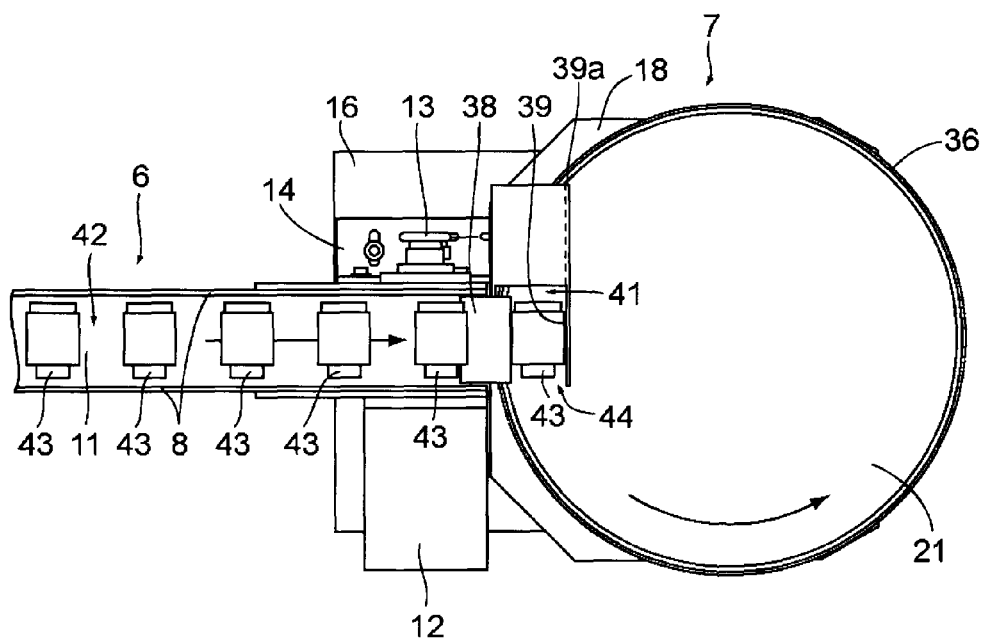
FIG. 7A is a plan view illustrating the product collection apparatus in the product conveyance state, and illustrating the state before the product is provided to the installation space.
Figure 7B:
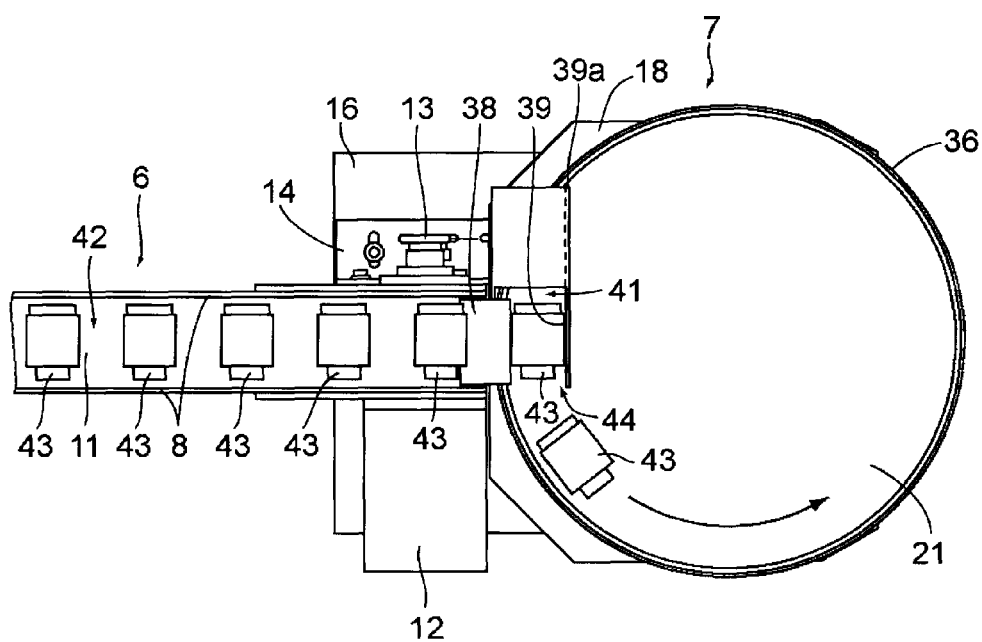
FIG. 7B is a plan view illustrating the product collection apparatus in the product conveyance state, and illustrating the state where the product has been provided to the installation space.

FIG. 6A is a main part sectional front view illustrating the product collection apparatus in a product conveyance state, and illustrating a state before a product is provided to an installation space. FIG. 6B is a main part sectional front view illustrating the product collection apparatus in the product conveyance state, and illustrating a state where the product has been provided to the installation space. FIG. 7A is a plan view illustrating the product collection apparatus in the product conveyance state, and illustrating the state before the product is provided to the installation space. FIG. 7B is a plan view illustrating the product collection apparatus in the product conveyance state, and illustrating the state where the product has been provided to the installation space.

As illustrated in FIG. 6A, the products 43 provided on the conveyance surface 42 is intermittently conveyed toward outside of the machine in order. As illustrated in FIG. 6B and FIG. 7A, the products 43 are led to discharge to the installation space 41 by the leading plate 38 at the half turn of the endless belt 11 outside of the machine, and the products 43 are provided onto the upper surface of the rotary table 21. In this manner, the products 43 are transferred to the rotary table 21 from the endless belt 11.

As illustrated in FIG. 7B, the products 43 provided on the rotary table 21 move around by 1 pitch of the rotary table 21 due to the rotation of the rotary table 21, and get out of the installation space 41 from an outlet 44 which is an opening part of the installation space 41. The 1 pitch of the rotary table 21 is set so that a space in which the products may not contact each other is formed in the installation space 41 when the product 43 is provided to the rotary table 21 from the endless belt 11.

Figure 8A:
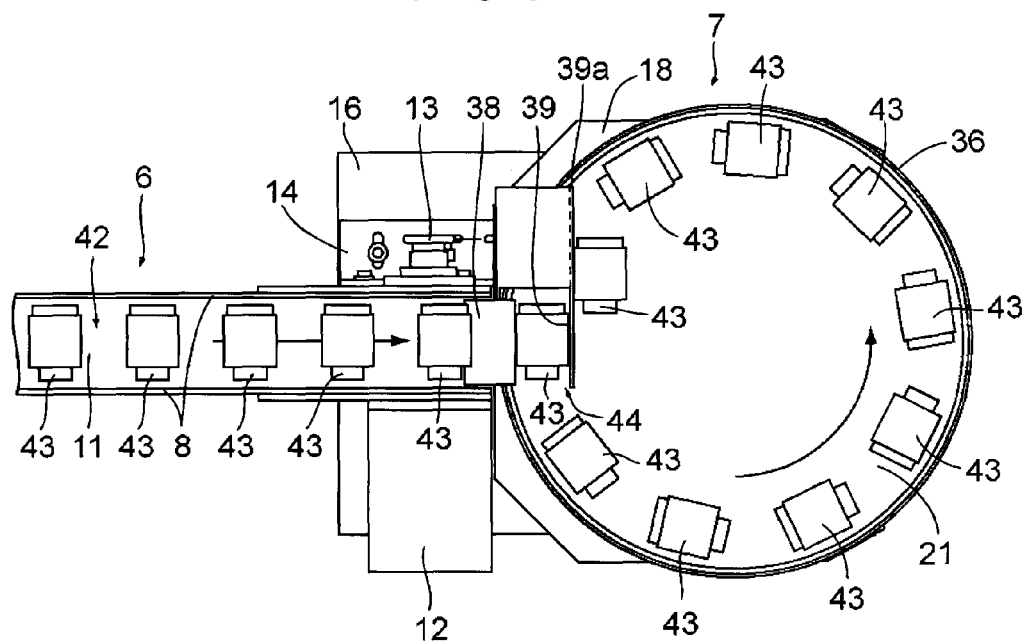
FIG. 8A is a plan view illustrating the product collection apparatus in a product accommodation state, and illustrating a state where the product abuts a guide plate.
Figure 8B:
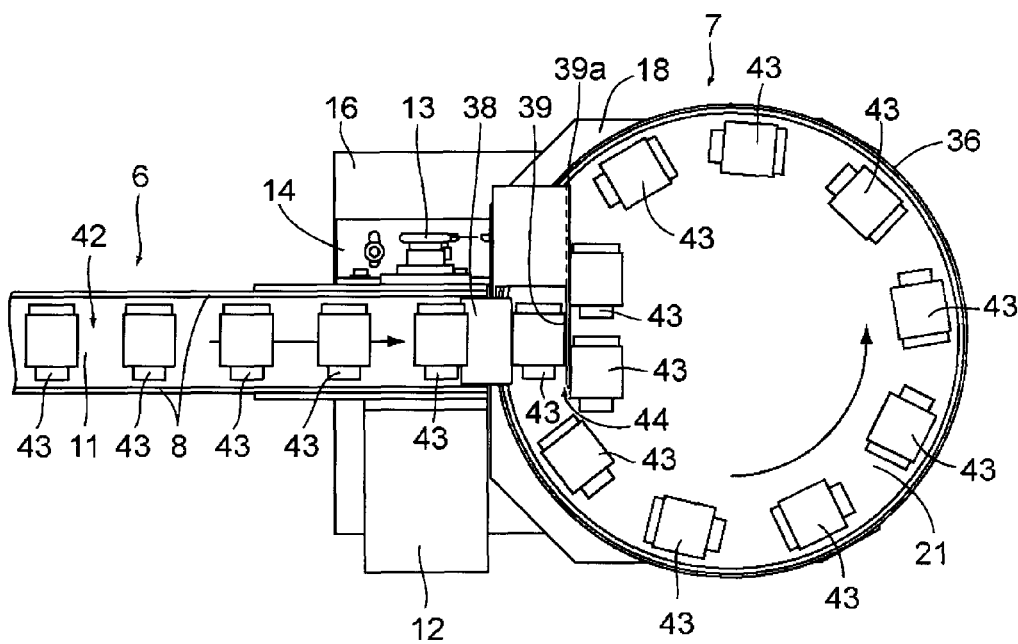
FIG. 8B is a plan view illustrating the product collection apparatus in the product accommodation state, and illustrating a state where the product moves along with the guide plate.

FIG. 8A is a plan view illustrating the product collection apparatus in a product accommodation state, and illustrating a state where the product abuts the guide plate. FIG. 8B is a plan view illustrating the product collection apparatus in the product accommodation state, and illustrating a state where the product moves along with the guide plate.

Once the product 43 on the rotary table 21 gets out of the installation space 41, the product 43 moves around with the rotation of the rotary table 21. The product 43 is prevented to entry into the installation space 41 by the guide plate 39. The product 43 abuts to the guide plate 39 to move along with the guide plate 39 without entering into the installation space 41, as illustrated in FIG. 8A.

As illustrated in FIG. 8B, the products 43 on the rotary table 21 abut to the guide plate 39 in order, and move along with the guide plate 39. Therefore, only the product 43 just discharged from the conveyor apparatus 6 is provided to the installation space 41, and therefore it is possible to prevent damage such as a scratch of the product 43 due to a contact or the like of the products in the installation space 41.

On the rotary table 21, the products may contact each other due to an increase of the number of the products 43 provided. However, since the rotary table 21 rotates intermittently, the products do not continuously contact each other on the rotary table 21. This is different from a case where the rotary table 21 continuously rotates. Therefore, it is possible to prevent the damage such as the scratch of the product 43 due to the contact of the products or the like.

In the product collection apparatus 4, when the conveyor apparatus 6 (the endless belt 11) is driven by the motor 12, the driving force is transferred to the rotary table 21 through the endless chain 29, and the accommodation unit 7 is driven (the rotary table 21 rotates). Therefore, an interlocking operation between the conveyor apparatus 6 and the accommodation unit 7 can be achieved with simple and lightweight constitution, without providing a dedicated actuator (such as a motor) to the rotary table 21.

The endless belt 11 and the rotary table 21 synchronize and rotate by the one motor 12, it is therefore possible to provide the product 43 simply and stably to the rotary table 21 from the endless belt 11 at an predetermined interval, by only falling and feeding the product 43 to the rotary table 21 from the endless belt 11.

Moreover, by moving the endless belt 11 intermittently, the rotary table 21 is automatically intermittently rotated by 1 pitch through the endless chain 29. Therefore, it is possible to easily interlock intermittent rotations of the endless belt 11 and the rotary table 21, without particular control such as detecting a supply of the product to the rotary table 21 and causing a rotation of the rotary table.

It is not necessary to provide a dedicated actuator (a motor) or the like to the rotary table 21, and therefore it reduces the product collection apparatus weight and it is easy to install the product collection apparatus. Therefore, the accommodation unit 7 (the rotary table 21) can be integrally provided on the conveyor apparatus 6 side (the frame 8) through a simple member such as the support plate 14, and the product collection apparatus can be easily mounted to a machine tool or the like. In particular, in a case of the machine tool in which the conveyor apparatus is provided in advance, it is also possible to mount the rotary table 21 or the like to the conveyor apparatus side easily, and after that, to place them in the product collection apparatus easily.

Figure 9:
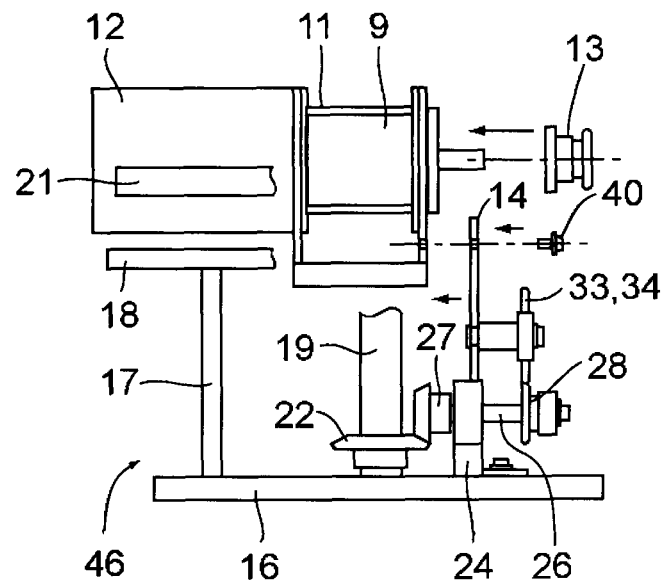
FIG. 9 is a main part sectional side view illustrating a mounting state of a rotary table unit onto a conveyor apparatus.
Figure 9:
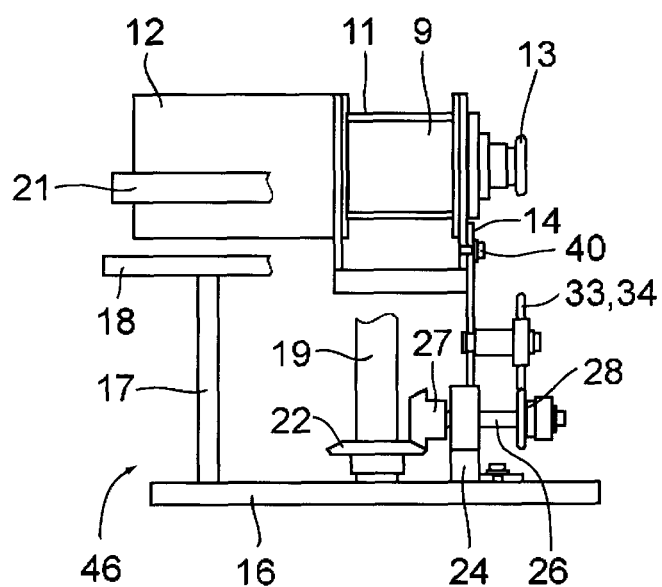

FIG. 9 is a main part sectional side view illustrating a mounting state of the rotary table unit onto the conveyor apparatus. For example, as illustrated in FIG. 9, by mounting the base plate 16, with which the rotary table 21 is supported in advance, on the support plate 14 to constitute a single rotary table unit 46, and by detachably mounting the support plate 14 to the frame 8 through a bolt 40 or the like, the rotary table 21 can be mounted on the conveyor apparatus 6 side in one operation.

In addition, in cases where the rotary table 21 is not necessary, the rotary table 21 can be easily removed from the conveyor apparatus 6 side with the whole rotary table unit 46, by removing the support plate 14 from the frame 8. The same symbols as those in FIG. 1 to FIG. 8 represent same parts in FIG. 9, and the description for same function is omitted.

In the rotary table unit 46, the driven sprocket 28 and the idler sprockets 33 and 34 are integrally pivotally supported, and therefore it is not necessary to detach each sprocket 28, 33 and 34 separately. Thus, it is possible to integrally constitute the transfer mechanism for transferring the driving force from the drive sprocket 13 to the driven sprocket 28 (linkage mechanism between the fulcrum shaft 9 and the support shaft 26) with the rotary table unit 46, except for the drive sprocket 13. Accordingly, it is easy to perform a detachment operation of the rotary table unit 46.

According to such constitution, an ordinary box-shaped product collection box (not illustrated) and the rotary table 21 (the rotary table unit 46) can be replaced easily and mounted on the conveyor apparatus 6. A proper use is also possible such that the rotary table 21 is used to prevent a scratch, damage and so on to the products in the case of collecting the products for which higher accuracy is required, and a product collection box is used to drop the products from the endless belt 11 into the product collection box and to collect the products therein in the case of collecting the products for which a drop collection is permissible. In the case of using the product collection box, the drive sprocket 13 may be removed.

Figure 10:
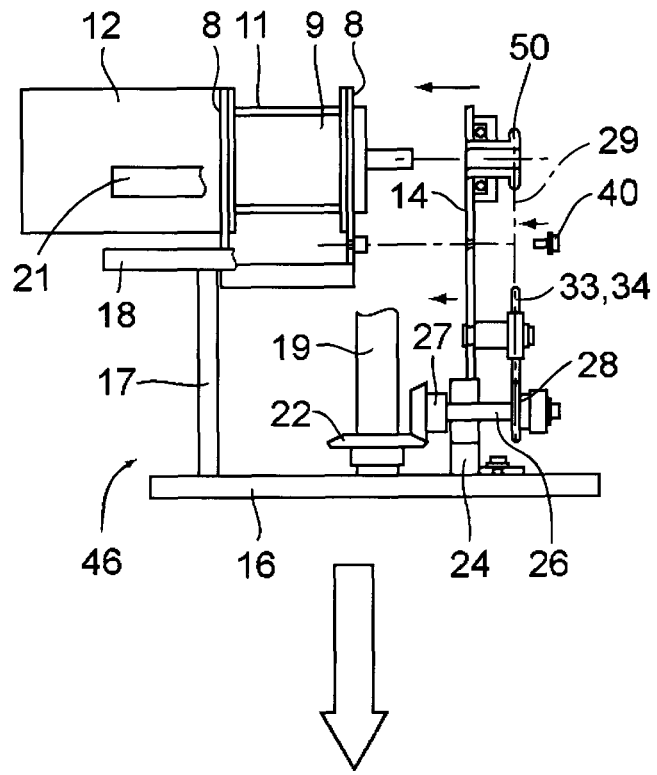
FIG. 10 is a main part sectional side view illustrating a mounting state of the rotary table unit onto the conveyor apparatus in another embodiment.
Figure 10:
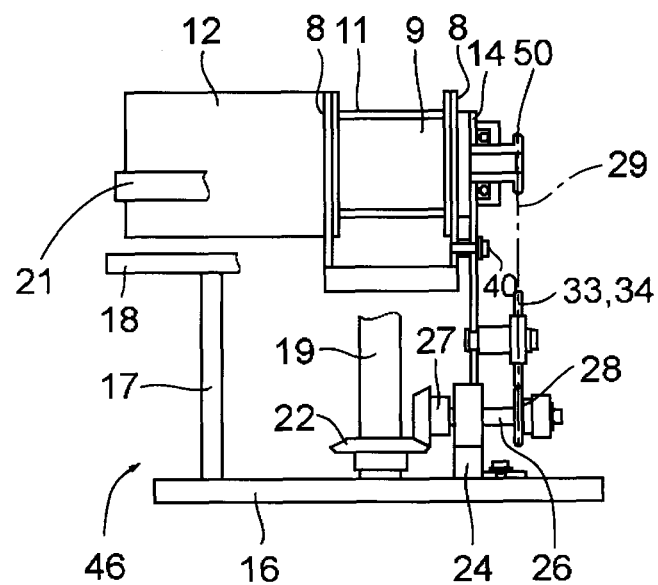

FIG. 10 is a main part sectional side view illustrating a mounting state of the rotary table unit onto the conveyor apparatus in another embodiment. As illustrated in FIG. 10, the rotary table unit 46 can also include a drive sprocket 50 by rotatably supporting the drive sprocket 50 in advance on the support plate 14 side, and by detachably fixing the support plate 14 to the frame 8 so that the drive sprocket 50 is attached to the fulcrum shaft 9.

Accordingly, overall transfer mechanism for transferring the driving force from the drive sprocket 50 to the driven sprocket 28 (linkage mechanism between the fulcrum shaft 9 and the support shaft 26) is integrally constituted with the rotary table unit 46. In this case, the endless chain 29 of which a tension is adjusted in advance can be wound between the drive sprocket 50 and the driven sprocket 28. Thus, detaching the rotary table 21 becomes easier. The same symbols as those in FIG. 1 to FIG. 9 represent same parts in FIG. 10, and the description for same function is omitted.

Figure 11:
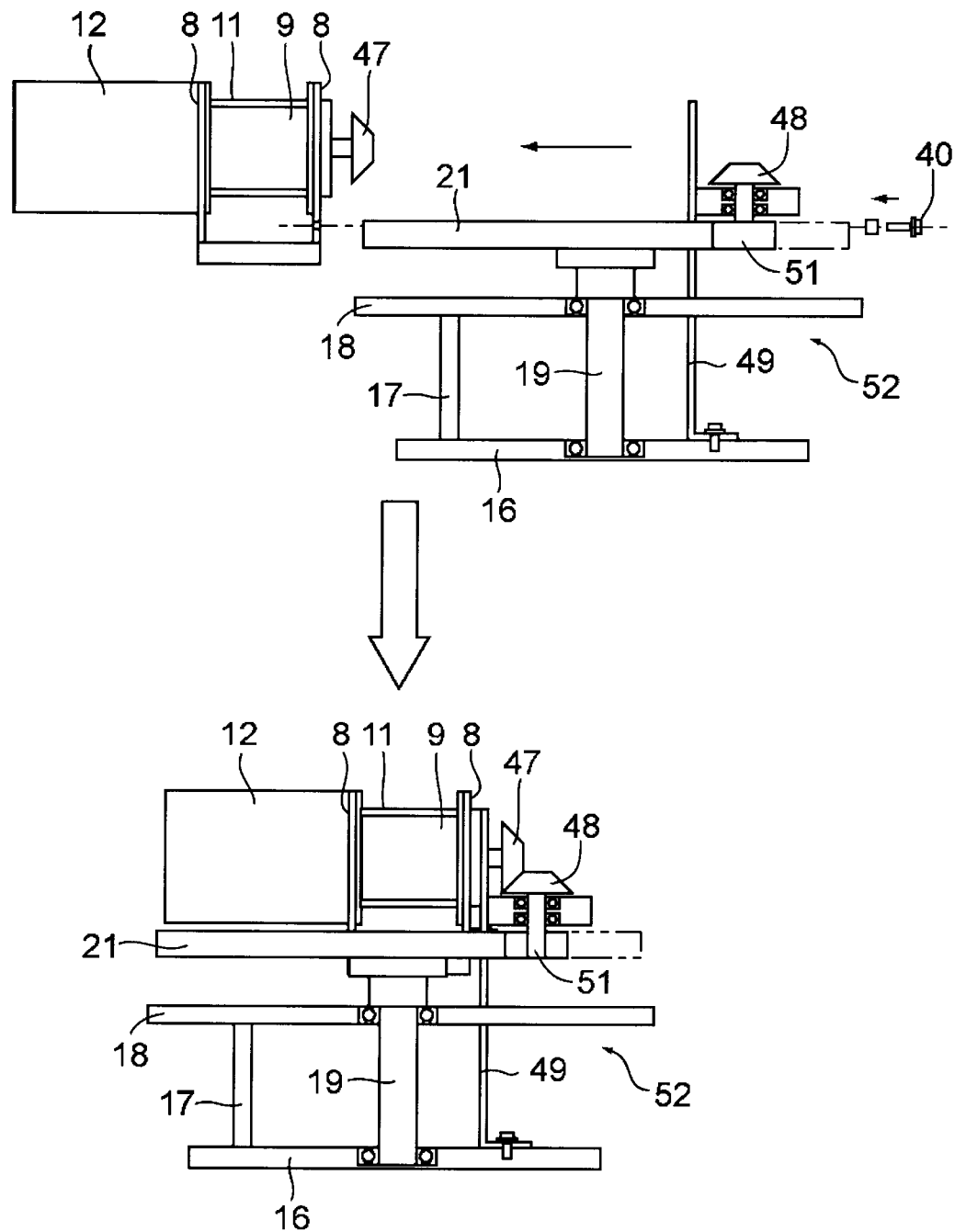
FIG. 11 is a main part sectional side view illustrating a mounting state of the rotary table unit onto the conveyor apparatus in still another embodiment.

FIG. 11 is a main part sectional side view illustrating a mounting state of the rotary table unit onto the conveyor apparatus in still another embodiment. As illustrated in FIG. 11, a bevel gear 47 can be mounted on the fulcrum shaft 9 instead of the drive sprocket 13, and a support plate 49 can also be used as the support plate to be mounted to the frame 8, the support plate 49 pivotally supporting the bevel gear 48 which engages with the bevel gear 47. In this case, for example, a spur gear 51 which integrally rotates with the bevel gear 48 may be provided and a gear which engages with the spur gear 51 may be formed on the outer circumference of the rotary table 21, so that the rotary table 21 can rotate.

Also in this case, according to a detachment of the support plate 49 to the frame 8, it is possible to easily detach the rotary table unit 52 on the conveyor apparatus 6 side. The same symbols as those in FIG. 1 to FIG. 10 represent same parts in FIG. 11, and the description for same function is omitted.

In cases where it is necessary to receive oil in a lower position of the product collection apparatus 4, it is possible to provide an oil pan for example, with supports on the main body 2 side and the frame 8 side of the conveyor apparatus 6. Furthermore it is possible to locate the base plate 16 in the oil pan. The product collection apparatus is applicable to not only an apparatus which collects the products processed with the machine tool such as the automatic lathe, but also a collection apparatus which conveys and accommodates (collects) various articles by a conveyor apparatus.

According to the structure of the present invention constituted as described above, there are advantages that the conveyance belt and the rotary table can be synchronously rotated with a simple constitution, and the products can be provided simply and stably from the conveyance belt to the rotary table.

Especially, by driving the actuator intermittently, the conveyance belt and the rotary table can be easily interlocked and rotated intermittently, contacts between the products to be accommodated in the rotary table or the like is reduced in comparison with a case of rotating the rotary table continuously, and the scratch, the damage and the like can be prevented at the time of accommodation of the products.

In addition, it is not necessary to provide a dedicated actuator to the rotary table, therefore the weight of the product collection apparatus is reduced and it is easy to install. Furthermore, for example, the rotary table is provided with a support on the frame side, the frame supporting the conveyance belt, and the rotary table can be simply and compactly provided integral with the conveyance belt. In cases where the rotary table is provided so that it is rotatably supported on the frame side, the frame supporting the conveyance belt, it is possible to integrally provide the support plate with the frame, to integrally fix the base plate to the support plate, and to rotatably support the rotary table by the base plate.

In this case, a sprocket is rotatably supported by the support plate, an endless chain is used as the linkage unit, the endless chain is wound between sprockets provided at the driving force input unit for conveyance belt and the driving force input unit for rotary table through other sprockets, the conveyance belt and the rotary table can be interlocked and driven, and the linkage mechanism of the conveyance belt and the rotary table can be compactly constituted on the support plate side.

The invention claimed is:

1. A product collection apparatus comprising:
   a conveyance belt to be rotated; a rotary table supported rotatably;
   a linkage unit which links a rotary portion which integrally rotates with the conveyance belt and a driving force input unit for rotary table which receives driving force to rotate the rotary table;
   an actuator which transfers the driving force to the conveyance belt and the rotary table through the linkage unit so that the rotary table interlocks with the conveyance belt,
   a base member a base member supporting the rotary table and
   a support member mounted on the base member, and detachably mounted on a frame which supports the conveyance belt,
   wherein a product conveyed by the conveyance belt is provided onto the upper surface of the rotary table and is collected, and
   the rotary table is detachably mounted at the conveyance belt through the base member and the support member.

2. The product collection apparatus according to claim 1, wherein the conveyance belt and the rotary table are rotated intermittently by driving the actuator intermittently.

3. The product collection apparatus according to claim 1, wherein a support plate is integrally fixed to the frame, a base plate is integrally fixed to the support plate, the rotary table is rotatably supported by the base plate, idler sprockets are rotatably supported by the support plate, and an endless chain which is the linkage unit is wound between a drive sprocket mounted on the driving force input unit for conveyance belt and a driven sprocket mounted on the driving force input unit for rotary table through the idler sprockets.

* * * * *